No. 750,056. PATENTED JAN. 19, 1904.
F. W. LINNERT.
FRICTION SPEED REGULATOR.
APPLICATION FILED JAN. 22, 1903.

NO MODEL.

Witnesses
Inventor
Frank W. Linnert,
by Higdon & Longan Atty's.

No. 750,056.                                          Patented January 19, 1904.

UNITED STATES PATENT OFFICE.

FRANK W. LINNERT, OF WARRENTON, MISSOURI.

FRICTION SPEED-REGULATOR.

SPECIFICATION forming part of Letters Patent No. 750,056, dated January 19, 1904.

Application filed January 22, 1903. Serial No. 140,088. (No model.)

*To all whom it may concern:*

Be it known that I, FRANK W. LINNERT, a citizen of the United States, residing at Warrenton, Missouri, have invented a new and useful Frictional Speed-Regulator, of which the following is a specification.

My invention relates to frictional speed-regulators for dental engines and the like; and my improved frictional speed-regulator comprises the combination, with a suitable motor-casing, of a driving-shaft mounted in the motor-casing, a face friction-wheel fixed upon one end of the shaft, bearing-brackets fixed to the motor-casing, a counter-shaft slidably and rotatably mounted in the bearings of the brackets at right angles to the driving-shaft and in the same level, a peripheral friction-wheel fixed upon the counter-shaft to engage and be driven by the face friction-wheel, shifting-rod brackets depending from the bearing-brackets, a shifting rod slidably mounted in the shifting-rod brackets parallel with the counter-shaft, a fork fixed upon the shifting rod to slide the counter-shaft, pulleys mounted in the shifting-rod brackets below the shifting rod, and a cord attached to the shifting rod and passing over said pulleys, all arranged so that by pulling one end of the cord the speed of the counter-shaft is increased and by pulling the other end of the cord the speed of the counter-shaft is decreased.

Figure 1:
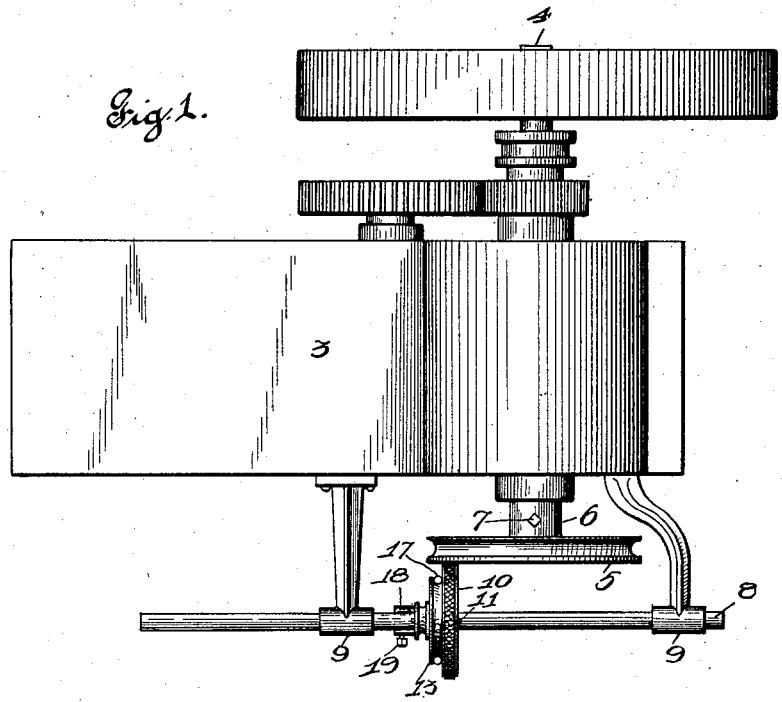
Figure 2:
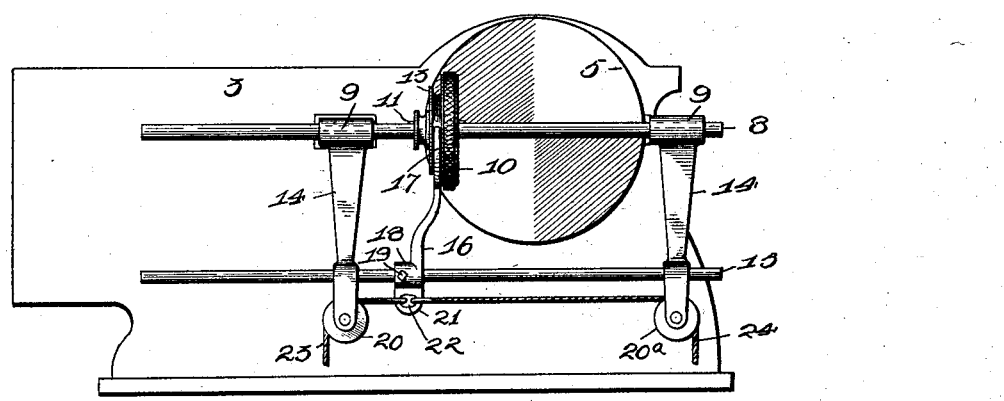

In the drawings, which form part of this specification, Figure 1 is a top plan view. Fig. 2 is a side elevation.

Referring to the drawings in detail, the driving-shaft 4 is mounted in the motor-casing 3, and the face friction-wheel 5 is fixed upon one end of the driving-shaft by means of the hub 6 and the set-screw 7. The bearing-brackets 9 are fixed to the same end of the motor-casing, and the counter-shaft 8 is slidingly and rotatably mounted in the bearings of the brackets. The peripheral friction-wheel 10 is fixed upon the counter-shaft 8 by means of the key 11 to engage and be driven by the face friction-wheel. The grooved hub 13 is formed in one side of the wheel 10. The shifting-rod brackets 14 depend from the bearings of the brackets 9, and the shifting rod 15 is slidingly mounted in the lower ends of said brackets 14. The fork 16, having the prongs 17 to engage the grooved hub 13, has a hub 18, rigidly mounted upon the shifting rod 15 by means of the set-screw 19. Forked bearings extend downwardly from the brackets 14 and carry the pulleys 20 and 20$^a$. A lug 21 extends downwardly from the hub 18 and has an opening 22. The cord is fastened to the lug 21, and the end 23 extends over the pulley 20, and the end 24 extends over the pulley 20$^a$.

It is obvious that the counter-shaft 8 may be controlled by pulling the ends 23 and 24. When the end 24 is pulled, the wheel 10 will move along the face of the wheel 5, decreasing the speed of the shaft 8 until the center of the wheel 5 is reached. Then continued pulling of the end 24 will cause the wheel 10 to pass the center of the wheel 5, reversing the direction of the shaft 8. Moving the wheel 10 toward the center of the wheel 5 decreases the speed of the shaft 8, and vice versa. Moving the wheel 10 past the center of the wheel 5 reverses the shaft 8.

The power, speed, and direction may be transmitted from the shaft 8 in any suitable and well-known manner.

I am aware that frictional speed-regulators have been used for various purposes, and I do not claim such mechanism broadly.

What I claim is—

A frictional speed-regulator, comprising the combination with a suitable motor-casing, of a driving-shaft mounted in the motor-casing; a face friction-wheel fixed upon one end of the shaft; bearing-brackets fixed to the motor-casing; a counter-shaft slidably and rotatably mounted in the bearings of the brackets, at right angles to the driving-shaft, a peripheral friction-wheel fixed upon the counter-shaft to engage and be driven by the face friction-wheel; shifting-rod brackets depending from the bearing-brackets; a shifting rod slidingly mounted in the shifting-rod brackets parallel with the counter-shaft; a fork fixed upon the shifting rod to slide the counter-shaft; pulleys mounted in the shifting-rod brackets below the shifting rod; and a cord attached to the shifting rod and passing over said pulley; all arranged so that by pulling one end of the cord, the speed of the counter-shaft is increased, and by pulling the other end of the cord the speed of the counter-shaft is decreased, substantially as specified.

In testimony whereof I affix my signature in presence of two witnesses.

FRANK W. LINNERT.

Witnesses:
    CHAS. W. TADLOCK,
    E. R. MORRIS.